Figure 1:
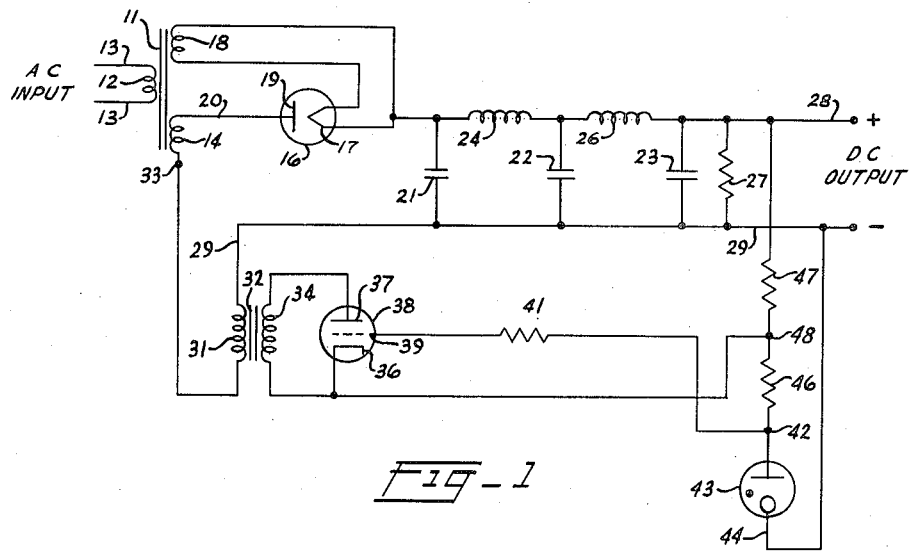

April 8, 1958    A. H. FREDRICK ET AL    2,830,250
VOLTAGE REGULATED POWER SUPPLY
Filed June 22, 1955

INVENTORS.
ARDEN H. FREDRICK
ALFRED S. GANO
BY
ATTORNEY

United States Patent Office 2,830,250
Patented Apr. 8, 1958

2,830,250

VOLTAGE REGULATED POWER SUPPLY

Arden H. Fredrick, Mount Kisco, and Alfred S. Gano, White Plains, N. Y., assignors to General Precision Laboratory Incorporated, a corporation of New York Application June 22, 1955, Serial No. 517,294

6 Claims. (Cl. 321—18)

This invention relates to voltage regulators and more particularly to electronic devices for maintaining constant voltage at the output of a direct current supply circuit.

The conventional electronic regulator includes a high vacuum electronic tube, which is connected in series with the output of the power supply filter. The plate resistance of this tube is controlled by the load voltage and by this resistance variation maintains the load voltage constant. Such a regulator has the defect that the conductance of the series tube limits the load and the range of regulation.

The instant invention employs a transformer as the agent by which resistance is inserted in the circuit in place of the usual tube. In one form of the invention inductive reactance is substituted for resistance as the controlling principle, so that control is effected by other means than the dissipation of part of the energy of the power supply.

In general, the apparatus of this invention includes an electromagnetic device placed in series with the secondary winding of the transformer of a rectifier power supply. The electromagnetic device is in turn controlled, preferably electronically, by the direct-current output voltage of the power supply. The voltage drop through the electronic device then so regulates the alternating current supply to the rectifier as to maintain the rectifier output voltage substantially constant. Voltage is thus maintained constant with varying input alternating-current potential and with varying load resistance.

In the employment of resistance to regulate the load voltage a transformer winding is connected in series with the alternating supply to the rectifier. The other winding of the transformer is connected to the plate circuit of an electronic tube controlled by the load voltage, so that the plate resistance of the tube is reflected through the transformer to the rectifier circuit. A transformer can be used because control is applied on the alternating current side of the rectifier, and use of a transformer permits effectively stepping up or down the range of the plate resistance of the control tube by any amount desired. Design is therefore not hampered by tube limitations as is the case when the tube plate resistance is inserted directly into the direct-current side of the rectifier.

In the employment of inductive reactance to regulate the load voltage a saturable reactor load winding is connected in series with the alternating supply to the rectifier. The control winding of the saturable reactor is energized by the plate current of a vacuum tube which is in turn responsive to the rectifier direct-current load voltage. Any change in the control winding current changes the reactance of the load winding, changing the charging time constant of the input capacitor of the rectifier and therefore changing the instantaneous current flow during each conduction interval, thereby changing the average current supplied in each cycle.

In both of these methods of control, by insertion of resistance and by insertion of inductive reactance, the load voltage is maintained constant in spite of variations in load and of variations in applied alternating voltage. Large amounts of power can be controlled and when inductive reactance is employed the control is efficient because control is not exercised by the dissipation of energy in a resistance.

One purpose of this invention is to provide a direct-current power supply voltage regulator having its series control element in the alternating current side of the power supply.

Another purpose of this invention is to regulate the output voltage of an electronic rectifier by the interposition of resistance in the input of the rectifier circuit through the medium of an electromagnetic element.

Another purpose of this invention is to maintain constant voltage at the load terminals of an electronic rectifier through the use of adjustable series impedance in the input circuit, the impedance being electronically controlled.

A further understanding of this invention may be secured from the detailed description and associated drawings, in which:

Figure 1 schematically depicts a power supply having resistance tube voltage regulation.

Figure 2:
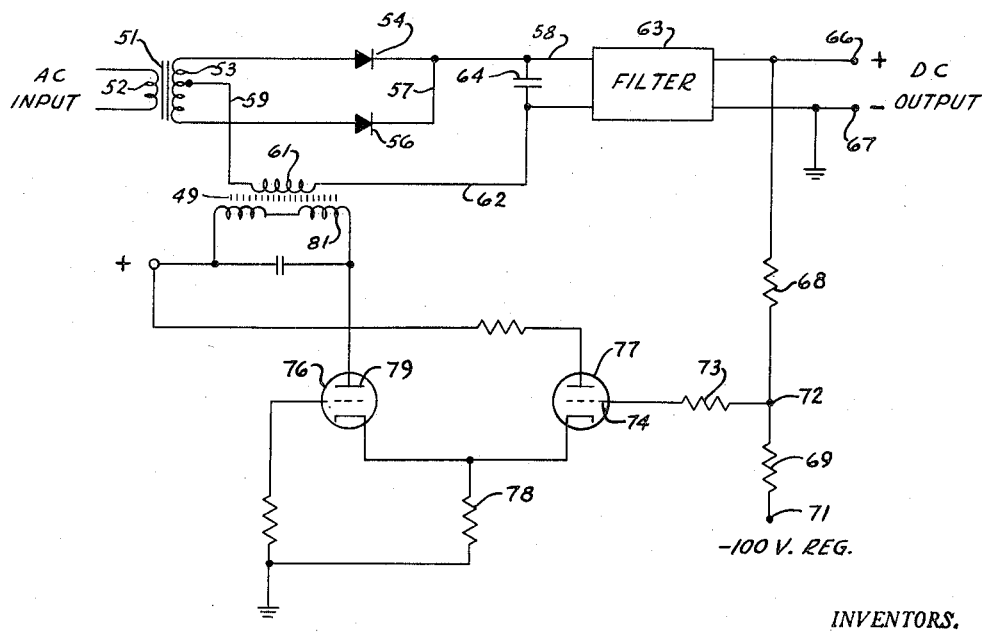

Figure 2 schematically depicts a power supply having voltage regulation effected by control of the time constant of the network supplying current for charging a condenser.

Referring now to Fig. 1, a power supply transformer 11 has a primary winding 12 energized from alternating current conductors 13, and a secondary winding 14 for the application of power to a rectifier. The rectifier is of the half-wave type and includes a two-element discharge tube 16 having a filament 17 energized from the separate filament winding 18 on transformer 11. The plate 19 of the tube 16 is connected through conductor 20 to one terminal of the secondary winding 14. One filament terminal constitutes the positive output terminal and is connected to a condenser-input filter comprising condensers 21, 22 and 23, inductance coils 24 and 26, and bleeder resistance 27. The regulated output is secured between the filter positive output conductor 28 and the negative return conductor 29.

One winding 31 of a regulating or control transformer 32 is connected in series between the return conductor 29 and the terminal 33 of the power transformer secondary winding 14. The other winding 34 of transformer 32 is connected between cathode 36 and plate 37 of a triode discharge tube 38. The control grid 39 of triode 38 is connected through resistor 41 to the positive terminal 42 of a voltage regulating tube 43 having its negative terminal 44 connected to the negative conductor 29. The positive terminal 42 is connected through resistors 46 and 47 to the power supply positive conductor 28. The cathode 36 of triode 38 is connected to the junction 48 of resistors 46 and 47, and resistor 46 is made of such size that its voltage drop, when the power supply output potential has its nominal value, provides normal grid bias to the triode 38.

The impedance ratio of transformer 32 is in most cases step-down from winding 34 to winding 31, so that the plate resistance of triode 38, divided by the transformer impedance ratio, is effectively applied in series with the alternating current supply to the rectifier. The complete alternating current path through the rectifier 16 includes transformer winding 31, power transformer secondary winding 14, conductor 20, diode 16, filter condenser 21 and conductor 29 returned to winding 31. The plate supply of triode 38 is secured through transformer 32 from the power supply circuit, this power being dissipated in heat in the triode 38. The plate resistance of triode 38 is controlled by the voltage drop in resistor 46 which is proportional to the voltage between output conductors 28 and 29.

In the operation of this circuit, a potential is applied by transformer 32 between cathode 36 and plate 37 of triode 38, and a selected potential is derived from resistor 46 controlling the plate resistance of triode 38 at the desired level. This plate resistance, reflected to the rectifier circuit, holds the output voltage at the desired nominal level. If, for example, the current load should increase at terminals 28—29, reducing the potential thereof, the voltage drop through resistor 46 is reduced. This lowers the negative bias on grid 39, lowering the triode plate resistance and also permitting it to conduct earlier in the cycle. This lowered resistance and increased induction angle is reflected through transformer 32 to the rectifier circuit, permitting higher pulsating current and/or an increased time of current flow tending to increase the charging current of condenser 21 and hence the direct-current output potential.

It is highly desirable that the filter have a condenser input rather than an inductance or resistance input. This requirement arises by reason of the fact that the resistor or inductor control element, such as winding 31 of regulating transformer 32, is connected in series in the return alternating path through the rectifier. If a filter input resistor or inductor were employed such element would be connected in series with the control element, reducing the control range.

Numerous equivalent components can be substituted in Fig. 1 for those described. For example half-wave, full wave or voltage multiplying circuits may be used employing high vacuum discharge tubes, gas tubes, dry disc rectifiers or crystal diodes. In place of the filter shown any of numerous other types may be employed, in all cases preferably having condenser input. In place of the voltage regulator tube voltage reference described other references may be employed such as a separate battery of primary cells, a regulated source of direct-current potential, the potential drop through an element of an electronic tube, or voltage drop referred to a selected characteristic of a nonlinear component.

Figure 2 illustrates the manner in which a saturable reactor may be utilized in practicing the invention. A power transformer 51 having an alternating current power source connected to its primary winding 52 has a center-tapped secondary winding 53 connected to two rectifying elements 54 and 56. These elements may be of any type and are conventionally poled for full-wave operation, with like terminals connected by conductor 57 and to the positive output conductor 58. The negative output conductor 59 is connected between the center tap of the secondary 53 and the load winding 61 of the saturable reactor 49. The other terminal of the load winding 61 is connected through the negative conductor 62 to the filter 63. The filter is schematically indicated by the rectangle 63, and has a capacitive input as indicated by the large condenser 64 connected across the filter input conductors 58 and 62. The direct current power output of the power supply is derived from the filter output terminals 66 and 67, terminal 67 of which is grounded.

A bleeder resistor circuit composed of resistors 68 and 69 is connected between the positive terminal 66 and a source of regulated negative potential indicated by the terminal 71. The values of resistors 68 and 69 are made such that normally the potential of junction 72 is slightly below ground. The voltage at the junction 72 constitutes the control potential for the saturable reactor 49 and this junction is connected through a resistor 73 to the input control grid 74 of a balanced direct-current amplifier stage comprising tubes 76 and 77 having its common cathode resistor 78 grounded. The amplifier output present at plate 79 is applied to one terminal of the control winding 81 of reactor 49, the other terminal of which is returned to a source of positive potential. The polarities of the amplifier stage are so chosen that a positive error signal presented at grid 74 produces a decrease of current through control winding 81. The same result can be secured by use of single-tube amplifier stages but in order to secure correct polarity an even number of stages must be employed.

The alternating current path during one-half cycle includes one terminal of secondary winding 53, either rectifier 54 or 56, conductor 58, condenser 64, conductor 62, saturable reactor load winding 61, and conductor 59 back to the center tap of secondary winding 53. The inductive reactance of reactor winding 61 is maximum when the current in control winding 81 is minimum, and the reactance is minimum when the control current is maximum.

In operation, alternating voltage applied to winding 52 and transformed in transformer 51 is rectified by elements 54 and 56 and applied through conductors 58 and 62, and filter 63, to output terminals 66 and 67. If the output voltage should drop, either because of increased load current or because of decreased input voltage, the potential of junction 72 is decreased, reducing the plate current of tube 77 and increasing that of tube 76. This results in an increased current through control winding 81, reducing the reactance of load winding 61. Inasmuch as the back voltage $$\left(L\frac{di}{dt}\right)$$

of the reactor is reduced there is a corresponding increase in the voltage across the rectifier and an ensuing increase in the instantaneous charging current.

What is claimed is:

1. A voltage regulator comprising, a source of alternating current, rectifier means energized by said source and converting the alternating current impressed thereon to a unidirectional current, a load circuit filter means interposed between the output of said rectifier means and said load circuit, a condenser connected in shunt to the input of said filter means, and saturable reactor means controlled in accordance with the potential existing across said load for adjusting the phase relation between the energizing potential of said alternating current source and the charging current of said condenser.

2. A voltage regulator comprising, a rectifier, a source of alternating current therefor, a saturable reactor winding and a condenser connected in a series circuit, a load circuit, filter means interposed between said rectifier and said load circuit and having its input shunted by said condenser, and means operated by a selected control potential for adjusting the impedance of said saturable reactor winding.

3. A voltage regulator comprising, a rectifier, a source of alternating current therefor, a saturable reactor winding and a condenser connected in a series circuit, a load circuit, filter means interposed between the output of said rectifier and said load circuit and having its input shunted by said condenser, and means controlled in accordance with the potential existing across said load circuit for regulating the impedance of said saturable reactor winding.

4. A voltage regulator comprising, a rectifier, a source of alternating current therefor, a saturable reactor winding and a condenser connected in a series circuit, a load circuit, filter means interposed between the output of said rectifier and said load circuit and having its input shunted by said condenser, and means controlled in accordance with the potential existing across said load circuit for regulating the inductance presented to said series circuit by said saturable reactor winding.

5. A voltage regulator comprising, a source of alternating current including a power transformer having an output winding, a direct-current load having a pair of input terminals, a rectifier having alternating-current input terminals and direct-current output terminals, means connecting said rectifier output terminals to said load input terminals, electrostatic capacitance means connected in shunt with said rectifier output terminals, a transformer having first and second windings, means connecting said first transformer winding, the output winding of said power transformer and the alternating-current input terminals of said rectifier in series, means for sampling the voltage applied to said direct-current load, a voltage reference, and means including a resistance connected to the second winding of said transformer for controlling the amount of charging current flowing into said electrostatic capacitance means in accordance with the voltage of said sampling means.

6. A voltage regulator comprising, a source of alternating current including a power transformer having an output winding, a direct-current load having a pair of input terminals, a rectifier having alternating current input terminals and direct-current output terminals, means connecting said rectifier output terminals to said load input terminals, electrostatic capacitance means connected in shunt with said rectifier output terminals, a saturable reactor having load and control windings, means connecting the load winding of said saturable reactor, the output winding of said power transformer and the alternating-current input terminals of said rectifier in series, means for sampling the voltage applied to said direct-current load, a voltage reference, and means connected to the control winding of said saturable reactor for controlling the current therein in accordance with the voltage of said sampling means referred to said voltage reference whereby the inductive reactance of said load winding is adjusted to control the phase duration and amplitude of the charging current flowing into said electrostatic capacitance means.

References Cited in the file of this patent

UNITED STATES PATENTS

| | | |
|---|---|---|
| 1,834,416 | Osgood | Dec. 1, 1931 |
| 2,018,348 | Dijksterhuis | Oct. 22, 1935 |
| 2,306,998 | Claesson | Dec. 29, 1942 |